Jan. 8, 1963  R. E. CHARLTON  3,072,423
ADJUSTABLE SUPPORT PIN
Filed Nov. 6, 1961

INVENTOR:
Roy E. Charlton

By Willard M. Graham
Agent

3,072,423
ADJUSTABLE SUPPORT PIN
Roy E. Charlton, Brea, Calif., assignor to Northrop Corporation, Beverly Hills, Calif., a corporation of California
Filed Nov. 6, 1961, Ser. No. 150,450
7 Claims. (Cl. 287—20)

This invention relates to mechanical support pins and, more particularly, to adjustable alignment pins for maintaining proper alignment of mating parts when subjected to a shock and vibration environment.

Heretofore, support pins and locating devices required precision location of the aperture with respect to the pin to permit accurate and positive engagement. The requirement for interchangeability of electrical module drawers in enclosure assemblies, for example, resulted in obvious mating problems inasmuch as the module and enclosure assembly are two separately designed and construtced units. In addition, these units are frequently subjected to shock loads up to 100 times gravity, which in many instances, results in distortion and misalignment of mating parts.

It is, therefore, an object of the present invention to provide a universally adjustable alignment and support pin which permits alignment of pins with a corresponding misaligned aperture, the alignment being possible at any point over an entire area, within the operating range of the adjustment.

A further object of this invention is to provide an adjustable support pin which permits interchangeable components without requiring precise locating of pins and mating apertures.

Still further objects of the present invention are to provide an adjustable support pin which does not have a tendency to mar adjacent panel surfaces or edges and which permits rapid assembly of mating parts, while at the same time being economical and rugged in character.

Briefly, my invention comprises a stud having a projecting annular shoulder near the middle thereof, one end of the stud beyond the shoulder consisting of a threaded portion with means provided to rotate the stud. The opposite end of the stud consists of a non-threaded tapered end pin. The threaded portion is eccentric with respect to the annular shoulder and the non-threaded pin end.

An eccentrically bored bushing having an integral nut-shaped projecting shoulder is positioned over the threaded portion of the stud, and adapted to be inserted in a circular hole. Rotation of the eccentric stud and eccentric bushing at the same end of the support pin assembly causes the other pin end to move horizontally and vertically throughout an entire area to locate the corresponding misaligned aperture. Locking means, at the same end as both the stud rotating means and the bushing rotating means, are provided to lock the bushing and support pin in position.

For a more complete understanding of the principles of this invention, reference is made to the following detailed description of a preferred embodiment thereof, and to the accompanying drawings, in which:

FIGURE 1 is a perspective exploded view of the parts of the adjustable support pin assembly, showing their manner of installation in a panel or other portion of a unit to be installed in an enclosure assembly.

FIGURE 2 is a longitudinal section view of the complete units as assembled, showing the central support pin itself in elevation.

Referring to FIGURES 1 and 2, a double ended pin 1 has an integral annular shoulder 2 which is concentric with respect to the axis of a support stud portion 3. The opposite end of the pin 1 beyond the annular shoulder 2 is a partially threaded shank 7 which is eccentric with respect to the axis of stud 3. An eccentrically bored bushing 13a is provided with a nut-shaped head 13 to facilitate rotation of this bushing. A concentric bushing 15 positioned in aperture 20 of a module panel 12 provides a bearing surface for eccentric bushing 13a. A lock nut 14 is provided to secure eccentric bushing 13a and eccentric shank 7 of pin 1 in position. Cap nut 9 secures lock nut 14 in position and protects personnel from contact with a slotted end 10 of eccentric shank 7. A plain bushing 11, together with bushing 15, prevents abrasive contact of the stud support pin and eccentric bushing 13a with module panel 12 and a mating enclosure assembly 17. It will be understood that panel 12 will in most instances have additional support pins therein, not necessarily adjustable, although they may be.

In use, the eccentric shank 7 with bushings 15 and 13a are inserted in aperture 20 of module panel 12. Bushing 11 is inserted in an aperture 18 of the enclosure assembly 17. Eccentric shank 7 and eccentric bushing head 13 are rotated to locate the stud 3 in enclosure 17. When the stud 3 is in mating relationship with the plain bushing 11, the module panel 12 is pushed into contact with the enclosure assembly 17. Nut 14 is tightened to secure the eccentric bushing 13a and eccentric shank 7 in position. Cap nut 9 is tightened to secure nut 14 in a locking position.

The novelty of this pin resides in its double eccentric structure, thus enabling it to locate and align with corresponding apertures which are out of alignment without resorting to oversize apertures. This novel feature permits interchangeability of removable assemblies, thus eliminating the requirement for ultra-precision location of pins and their corresponding apertures. In addition, module drawers and/or enclosure assemblies when forced out of alignment while in use may be easily aligned by using these pins. Use of these suppor pins prevents misalignment of mating parts when subjected to extreme shock and vibration loads.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An adjustable support pin comprising a stud having two offset-axis essentially cylindrical end portions and a shoulder therebetween, a decreasing-diameter taper on a first one of said end portions, eccentrically bored bushing means slidably fitted on the other said end portion, means on said other end for rotating said stud, a flange on the end of said bushing means toward said other end portion, means on said flange for rotation of said bushing means, and locking means connected with said other stud end for locking an apertured member in place between said shoulder and said flange with said stud and said bushing means in any position of rotation.

2. Apparatus in accordance with claim 1 wherein said means for rotating said stud comprises a tool-fitting recess in the center of said other stud end portion.

3. Apparatus in accordance with claim 1 wherein said means for rotating said bushing means comprises tool-fitting structure on the periphery of said flange.

4. Apparatus in accordance with claim 1 wherein screw threads are provided on said other stud end portion, and wherein said locking means comprises a nut member threaded on said threads against the outer side of said bushing means.

5. An adjustable support pin assembly comprising a stud having two eccentrically aligned cylinder-like end portions and a shoulder therebetween, eccentrically bored bushing means having a flange on one end thereof and slidably mounted on one end portion of said stud with said flange on the end opposed to said shoulder, a panel member having an aperture therein, said aperture mating with the outer diameter of said bushing means and positioned between said flange and said shoulder, means on said one end portion of said stud for adjustable rotation thereof within said bushing means, means on said bushing means for adjustable rotation thereof within said aperture, and locking means on said one end portion of said stud beyond said bushing means for tightly clamping together said pin assembly and said panel in any relative rotative position, the other end portion of said stud projecting from said panel and adapted to fit in a locating hole of a separate mating component.

6. Apparatus in accordance with claim 5 wherein said eccentric bushing means comprises an inner eccentric bushing fixed to said flange and having rotating tool structure on said flange, and an outer concentric-bored bushing fitting between said inner bushing and said aperture.

7. Apparatus in accordance with claim 5 wherein said means for adjustable rotation of said stud comprises a tool-fitting recess in the center of the outer end of said one stud end portion, and said locking means comprises a lock nut threaded on said one stud end portion against the outer side of said bushing means.

References Cited in the file of this patent

UNITED STATES PATENTS

| | | |
|---|---|---|
| 1,097,185 | Oehrle | May 19, 1914 |
| 2,637,241 | Weber et al. | May 5, 1953 |
| 3,004,784 | Selby | Oct. 17, 1961 |
| 3,006,443 | Siler | Oct. 31, 1961 |

FOREIGN PATENTS

| | | |
|---|---|---|
| 136,372 | Great Britain | Dec. 18, 1919 |